June 17, 1969     W. P. FROEHNER ET AL     3,450,155

FRICTIONLESS RELIEF VALVE

Filed Feb. 6, 1964

INVENTORS.
WARREN P. FROEHNER
ROBERT E. SWALLOW
DELBERT W. HUFFMAN
BY

*P. H. Fischt*

ATTORNEY.

United States Patent Office 3,450,155
Patented June 17, 1969

3,450,155
FRICTIONLESS RELIEF VALVE
Warren P. Froehner and Robert E. Swallow, China Lake, Calif., and Delbert W. Huffman, Gold Hill, Oreg., assignors to the United States of America as represented by the Secretary of the Navy
Filed Feb. 6, 1964, Ser. No. 343,160
Int. Cl. F16k 17/04
U.S. Cl. 137—508                      1 Claim The invention herein described may be manufactured and used by or for the Government of the United States of America for governmental purposes without the payment of any royalties thereon or therefor.

The present invention relates to a mechanical relief valve and more particularly to a pressure release valve for maintaining control of a pressurized system and in which friction losses have been eliminated.

Conventional relief valves, for example, those which employ springs or weights or sliding seals have higher internal energy losses resulting in a less uniform response of the valve to changes in pressure which in turn results a decrease of sensitivity and increases the range in which the pressure of the system may vary; a sort of hysteresis effect. The pressure relief valve of the present invention overcomes the disadvantages of the aforementioned conventional relief valves and comprises a bellows assembly carrying a valve plate in which a ball valve is normally seated, an increase in pressure serving to deform the bellows assembly and move the plate in a direction to unseat the ball valve by means of an adjustable rod.

It is therefore an object of the present invention to provide a pressure relief valve which is sensitive to changes of pressure in the pressurized system.

Another object is the provision of a mechanical pressure relief valve in which internal energy losses have been substantially reduced or eliminated.

Other objects, advantages and novel feature of the invention will become apparent from the following detailed description of the invention when considered in conjunction with the accompanying drawings wherein.

Figure 1:
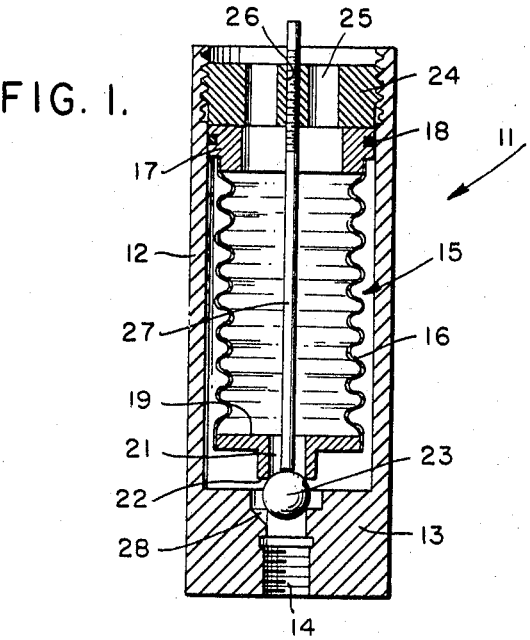
FIG. 1 is a cross sectional elevation of a relief valve embodying the invention.
Figure 2:
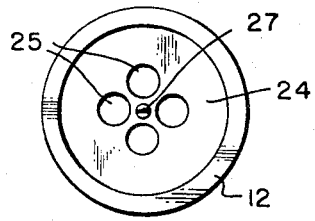
FIG. 2 is a plan view of the upper end of the valve of FIG. 1.

Referring now to the drawings, wherein like reference characters are used throughout the drawings to refer to like or corresponding parts, there is shown in FIG. 1 a cross sectional view of a pressure relief valve embodying the invention, the valve being generally designated by reference numeral 11. The pressure relief valve 11 comprises a casing 12 which at one end thereof is formed with an end wall 13 and an inlet opening 14 therein, for suitable connection to the pressurized system the pressure of which is to be controlled by the valve. Supported within the casing 12 is a bellows assembly 15 comprising a convoluted envelope 16 soldered or otherwise sealed to annular base member 17 which is sealed to the casing by means of O-ring 18. Soldering or otherwise sealed to the other end of the envelope is a valve plate 19 formed with a central opening 21 provided with a valve seat 22 adapted to receive a ball valve 23. Base member 17 is retained within the casing by means of a closure plug 24 which is threadedly engaged with the end of the casing 12. Plug 24 is suitably bored as seen in FIG. 2 to provide exhaust ports 25, the central portion of the plug being provided with a central bore 26 in which is received the threaded portion of an adjusting rod 27 for a purpose later made apparent. In the expanded position of the bellows assembly the ball valve 23 will be held against the inner end of inlet opening 14, the opening being provided with a groove 28.

In the operation of the valve, the relief valve of this invention is connected to the pressurized system, the pressurized system, the pressure of which it is desired to control, by means of the inlet opening. The pressure surrounding the bellows will then be the same as the pressure in the pressurized system; however, no fluid will escape because of the seated ball valve and the O-ring seal. The adjustment rod 27 is positioned so that the inner end thereof will touch, but not move, the ball valve when the bellows is compressed in accordance with a desired pressure within the system. When the pressure of the system exceeds the desired pressure, the bellows will be compressed so that the ball valve is forced off the valve seat by the adjustment rod and the pressurized fluid then escapes between the ball valve and valve seat and out the exhaust ports. As the pressure drops below the desired pressure valve seat re-engages the ball valve and flow of the pressurized fluid is stopped.

The valve has no parts which are in sliding engagement and thereby causing friction. Motion is achieved by compressing a bellows and when the motion is so limited as to not exceed the yield point of the bellows material the internal energy losses are negligible.

There has thus been provided a relief valve in which the internal friction losses have been substantially reduced or eliminated, thereby providing a relief valve which is very sensitive to pressure differential for a more uniform pressure control of the system.

Figure 3:
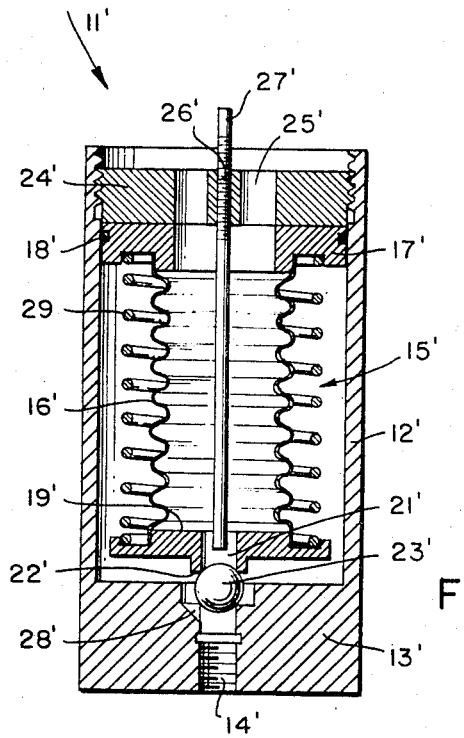
FIG. 3 is a cross sectional elevation of an alternative form of the valve of the invention.

In pressure systems which would compress or deflect the bellows beyond the yield point of the material, a spring 29 may be incorporated or associated with the bellows assembly to increase the bellows spring rate and decrease the deflection of the bellows assembly. Such a construction is shown in FIG. 3 wherein parts or elements corresponding to FIG. 1 are referenced by a primed numeral.

What is claimed is:

1. A relief valve adapted for use with a pressurized fluid system for controlling the pressure of the system comprising:

a cylindrical body casing having an inlet passage way formed with a valve seat at one end and exhaust ports at the other end;

said inlet passage way and exhaust ports being axially aligned with the center axis of the body casing;

a bellows assembly supported within an spaced from the inner walls of said body casing comprising a flexible convoluted envelope having ends;

one end of said assembly terminating adjacent said exhaust ports in a sealing member;

said sealing member having an opening in communication with the interior of said bellows assembly and said exhaust ports;

the other end of said bellows assembly terminating in another valve seat having a passageway therethrough;

a valve element associated with said valve member and engageable with the valve seat on said inlet passage way and said another valve seat in rest condition so that fluid from the inlet passageway is precluded from flowing to the exhaust ports;

said inlet passageway also having a relief portion thereby allowing fluid from said inlet passageway to flow into said casing and fill space between said bellows assembly and said body casing; and adjustable means adjustably attached to the end of said body casing having exhaust ports therein and engaging said valve element for unseating said valve element from said another valve seat when fluid pressure at said inlet passageway is sufficient to overcome said bellows assembly and move it axially.

References Cited

UNITED STATES PATENTS

| | | | |
|---|---|---|---|
| 2,689,583 | 9/1954 | Gardiner | 137—508 X |
| 2,693,821 | 11/1954 | Cornelius | 137—508 |
| 2,845,088 | 7/1958 | Crausman | 137—508 |
| 2,918,930 | 12/1959 | Jansen | 137—505.42 |

HAROLD W. WEAKLEY, *Primary Examiner.*